(12) United States Patent
Von Schuttenbach et al.

(10) Patent No.: US 12,404,843 B2
(45) Date of Patent: Sep. 2, 2025

(54) WHEEL GENERATOR

(71) Applicant: KES-Tech-Group GmbH, Bahrendorf (DE)

(72) Inventors: Andreas Von Schuttenbach, Ingolstadt (DE); Maik Kraus, Magdeburg (DE)

(73) Assignee: KES-TECH GROUP GMBH, Bahrendorf (DE)

( * ) Notice: Subject to any disclaimer, the term of this patent is extended or adjusted under 35 U.S.C. 154(b) by 225 days.

(21) Appl. No.: 18/263,967

(22) PCT Filed: Jan. 18, 2022

(86) PCT No.: PCT/EP2022/051023
§ 371 (c)(1),
(2) Date: Aug. 2, 2023

(87) PCT Pub. No.: WO2022/167214
PCT Pub. Date: Aug. 11, 2022

(65) Prior Publication Data
US 2024/0102458 A1    Mar. 28, 2024

(30) Foreign Application Priority Data

Feb. 3, 2021  (EP) .................................. 21154949
Aug. 20, 2021 (EP) .................................. 21192439

(51) Int. Cl.
*H02K 7/02* (2006.01)
*F03G 7/08* (2006.01)
*H02K 7/108* (2006.01)
*H02K 7/18* (2006.01)

(52) U.S. Cl.
CPC ............... *F03G 7/081* (2021.08); *H02K 7/02* (2013.01); *H02K 7/108* (2013.01); *H02K 7/1846* (2013.01)

(58) Field of Classification Search
CPC .......... F03G 7/081; H02K 7/02; H02K 7/108; H02K 7/1846; F05B 2220/706
See application file for complete search history.

(56) References Cited

U.S. PATENT DOCUMENTS

| | | | |
|---|---|---|---|
| 2004/0130157 A1* | 7/2004 | Naar | B60K 25/08 290/1 R |
| 2018/0297399 A1* | 10/2018 | Matsuda | F16C 19/181 |
| 2020/0072290 A1* | 3/2020 | Gunji | F16C 19/52 |

FOREIGN PATENT DOCUMENTS

| | | | | |
|---|---|---|---|---|
| CN | 105626400 A | 6/2016 | | |
| EP | 3540921 A1 | 9/2019 | | |
| WO | WO-2007088627 A1 * | 8/2007 | | B60B 19/00 |
| WO | 2015/054763 A1 | 4/2015 | | |

OTHER PUBLICATIONS

WO-2007088627-A1, all pages, (Year: 2007).*

* cited by examiner

*Primary Examiner* — Naishadh N Desai
(74) *Attorney, Agent, or Firm* — McDonnell Boehnen Hulbert & Berghoff LLP

(57) ABSTRACT

The present invention relates to a wheel generator, namely a converter for obtaining electrical energy in a rolling wheel of a vehicle from the deformation of the wheel tire due to contact with the road surface, a system for obtaining electrical energy including the converter, as well as a vehicle or wheel including the system.

15 Claims, 14 Drawing Sheets

WHEEL GENERATOR

CROSS REFERENCE TO RELATED APPLICATIONS

This application is a U.S. national phase of International Application No. PCT/EP2022/051023, filed Jan. 18, 2022, which claims priority to European Application No. 21192439.4, filed Aug. 20, 2021, which claims priority to European Application No. 21154949.8, filed Feb. 3, 2021, all of which are incorporated by reference herein in their entirety.

FIELD OF DISCLOSURE

The present invention relates to a wheel generator, namely a converter for obtaining electrical energy in a rolling wheel of a vehicle from the deformation of the wheel tire due to contact with the road surface. The present invention also relates to a system for obtaining electrical energy, as well as a vehicle or wheel comprising the system.

BACKGROUND

Vehicle tires, in particular pneumatic tires, are deformed under load in the area of the contact surface during the rolling process. In the process, the tire is flexed and there is a loss of energy during power transmission due to heating. This effect is referred to as flexing.

The force required to flex the tire is a major component of rolling resistance and acts against the driving force of a vehicle. On the one hand, increased flexing thus directly causes increased fuel consumption of the vehicle and can further also reduce the service life of the tire. On the other hand, a certain deformation of the tire and thus an increase in the contact area of the tire on the ground is quite desirable for the purpose of increasing the traction coefficient of the vehicle and also for the purpose of enhancing driving comfort. Typically, therefore, the air pressure in a pneumatic tire is set as a compromise between flexing and the traction of the vehicle.

The energy loss due to flexing of the tire is one of the main components of the total energy loss in a vehicle, along with air resistance. In the field of electric cars in particular, the development of systems for recuperation (energy recovery, in particular for supplying the vehicle battery) based on exploiting the flexing of vehicle tires has therefore been of interest for several years.

Various methods and systems for obtaining energy on or in the vehicle tire are known in the prior art, primarily for supplying diverse tire monitoring sensors arranged in the tire with electrical energy, for example tire pressure sensors.

WO 2015/054763 A1 thus discloses a generator in a tire, in which using the slight deformation and reduction of space that occurs in the inner part of the tire between the wheel and the same when in contact with the ground, a reciprocating motion is generated and a device is activated to rotate the generator.

Furthermore, EP 3 540 921 A1 discloses an energy converter for generating electrical energy in a rolling wheel of a vehicle by utilising the elastic deformation of the wheel between the driving plane and the center axis of the wheel. The energy converter has a lever element with a projecting arm rotatably mounted about an axis of rotation, wherein the lever element is configured to be arranged in a wheel for a vehicle such that deformation of the tread towards the center axis of the wheel produces a force acting on a contact surface of the projecting arm, and the force acting on the contact surface causes rotational movement of the projecting arm in a pumping rotational direction about the axis of rotation.

However, with the converters known in the prior art, direct contact with the wheel tire occurs between the levers or projecting arms, which are firmly connected to the rim. It has been shown that at higher speeds, possibly with a typical car tire no more than above approx. 50 km/h, direct contact between the levers and the wheel tire results in considerable heating of the tire material at the contact point, its softening and an increase in stickiness, damage to the wheel and thus ultimately to the failure of the generator.

US2004/0130157 A1 discloses a wheeled vehicle, which has mechanical and preferably hydraulic pumps in its tires. The weight of the vehicle pumps up a storage tank as the tires roll. The pressure in the storage tank is used to directly or indirectly drive the vehicle. The pumps are driven by brackets that carry rollers. These come into contact with specially designed beads on the inside of the tire.

In all converters known in the prior art, the lever elements are further arranged at an angle considerably under 45° to the surface of the inside of the tire. On the one hand, this reduces the forces that occur as a result of the direct contact between the levers and the surface of the inside of the tire at the contact point. On the other hand, however, this reduces the effective displacement of the lever elements, i.e. the angular range they sweep during their movement.

SUMMARY

It is the object of the present invention to provide a converter for obtaining electrical energy in a rolling wheel of a vehicle from the deformation of the wheel tire due to contact with the road surface, which does not have the problems of the prior art, and in particular guarantees reliable operation even at higher speeds with a high degree of efficiency.

This object is achieved according to the present invention with a converter for obtaining electrical energy in a rolling wheel of a vehicle from the deformation of the wheel tire due to contact with the road surface, comprising at least one lever element, which at its first end is rotatably housed, and at its second end is configured to come into contact with the inside of a wheel tire via at least one contact element such that a deformation of the wheel tire due to contact with the road surface causes a rotational movement of the lever element, a mechanical coupling element which is suitable for transferring the force occurring due to the rotational movement of the lever element, and at least one electric generator configured to convert the force preferably transferred by the mechanical coupling element into electrical energy, wherein, at the second end of the lever element, the contact element is rotatably housed in/at the lever element about an axis of rotation such that the contact element establishes contact between the lever element and the wheel tire, wherein the axis of rotation of the contact element runs substantially parallel to the axis of rotation of the wheel, and the sum (A+B) of the distance A of the fulcrum N of the lever element (1) from the wheel center M and the distance B of the fulcrum N from the contact point K of the contact element with the inside of the wheel tire, in the case of a plurality of contact elements per lever element the contact point with the greatest distance from the fulcrum N, relative to the radius of the inside of the wheel tire R ((A+B)/R)) is in the range from 102% to 110%. Advantageous embodiments are the subject of the dependent claims.

The invention is based on the realization that in the case of known generators, their levers or projecting arms, which are firmly connected to the rim, cause friction when they come into direct contact with the wheel tire and consequently generate strong local heat. During its flexing movement, the wheel tire performs a non-linear movement with respect to the rim, i.e. starting from the rim as the reference system, the movement of a defined part of the wheel tire that comes into contact with the road surface is not on a straight line during a wheel rotation, but circumscribes a surface. In the case of levers or projecting arms that are only rotatably mounted, a relative movement of the corresponding contact surface of the wheel tire and the contacting lever or projecting arm thus occurs when the wheel rotates, resulting in friction between them. The latter seems to lead to the failure of the known generators, in particular at higher speeds, as low as above approx. 50 km/h with a typical car tire. Furthermore, the lever elements are arranged at an angle considerably under 45° to the surface of the inside of the tire. On the one hand, this reduces the forces and thus the friction that occur as a result of the direct contact between the levers and the wheel tire at the contact point. On the other hand, however, this reduces the effective displacement of the lever elements, i.e. the angular range they sweep during their movement.

According to the invention, it has now surprisingly been found that this problem can be solved by means of a combination of measures, namely by virtue of the fact that on the one hand at least one contact element, typically a roller or part of a roller (roller segment), is rotatably housed at the second end of the lever element such that the contact element establishes contact between the lever element and the wheel tire, and the axis of rotation of the contact element runs substantially parallel to the axis of rotation of the wheel. The contact element is rotatably housed at the second end of the lever element about an axis of rotation and establishes contact between the lever element and the wheel tire. Thanks to its rotatable mounting, it is able to compensate for the relative movement between the wheel tire and lever element via its own rolling movement and thus minimize or prevent friction between the wheel tire and lever element. On the other hand, the displacement of the lever elements, i.e. the angular range they sweep during their movement, is considerably increased if the sum (A+B) of the distance A of the fulcrum N of the lever element from the wheel center M and the distance B of the fulcrum N from the contact point K of the contact element with the inside of the wheel tire, in the case of a plurality of contact elements per lever element the contact point with the greatest distance from the fulcrum N, relative to the radius of the inside of the wheel tire R ((A+B)/R) is in the range from 102% to 110%. This value range for (A+B)/R means a considerably more "stretched" arrangement of the lever elements compared to the prior art such that these are arranged almost vertically opposite the inside of the tire. Although this increases the forces and relative movement between the wheel tire and lever element, it enables a high degree of efficiency as it is only by increasing the angular range that the lever elements sweep during their movement that an effective drive of the generators can be ensured.

The invention is now described in further details based on preferred embodiments.

The converter according to the invention for obtaining electrical energy in a rolling wheel, wherein the wheel comprises a wheel tire typically filled with compressed air, of a vehicle from the deformation of the wheel tire due to contact with the road surface comprises at least one lever element, which at its first end is rotatably housed, and at its second end is configured to come into contact with the inside of the wheel tire via at least one contact element such that a deformation of the wheel tire due to contact with the road surface causes a rotational movement of the lever element.

Rotational movement of the lever element is typically understood as a partial rotation (pivoting movement) of the lever element about the axis of rotation N at the first end. The lever element is therefore specifically designed to detect deformations of the wheel tire occurring in the area of the contact surface by means of the contact element during the rolling process of the loaded wheel rolling on a substantially even driving plane and convert them into a rotational movement about the axis of rotation N at the first end of the lever element. The lever element thus has no direct contact itself with the inside of the tire, but is rather merely in contact therewith via the at least one contact element. According to one embodiment of the converter, it or the lever element is therefore configured such that the contact surface of the contact element of the lever element is designed to establish contact with an inner surface of the tire of the wheel.

The lever element is rotatably mounted at its first end, preferably on the supporting structure or the rim of the wheel. In principle, the direction of rotation N at the first end of the lever element can have any direction that runs substantially parallel to its corresponding contact surface on the inside of the wheel tire as the flexing movement of the inside of the wheel tire, i.e. a movement towards the rim, can thus lead to a partial rotation of the lever element. In one preferred embodiment, the fulcrum of the lever element runs substantially parallel to the axis of rotation of the wheel.

Within the scope of the present invention, substantially parallel preferably means a deviation from the parallel of less than 10°, more preferably less than 5°.

In one preferred embodiment, the lever element is designed in one piece. In this embodiment, it preferably supports one, in particular only one, contact element, which is rotatably mounted thereon. In an alternative likewise preferred embodiment, the lever element is formed in at least two parts, i.e. consists of at least two, preferably only two, parts, which are mechanically connected, preferably partially rotatable relative to one another. By way of example, the first part of the lever element forms the first end, on which the lever element is rotatably mounted, the second part constitutes the second end, which supports the contact element(s). The partial rotatability of the first part relative to the second part enables the rotational movement (rocking movement) of the lever element to be compensated for during contact of the contact elements with the inside of the flexed tire and at the same time the contact of the contact elements with the inside of the tire to be maintained. In this alternative embodiment, the lever element preferably supports at least two, in particular only two, contact elements, which are rotatably mounted on this, in particular the second part. Particularly preferably, in the alternative embodiment, the lever element thus consists of a first part with the first end, and the second part, which constitutes a holding element for at least two, preferably two contact elements, thus preferably constitutes a rolling slide. The latter is configured such that both contact elements can make contact with the inside of the wheel tire (surface of the inside of the tire) at the same time. In this way, the contact surface on the inside of the wheel tire can be increased, and thus the point force and thus the point load of the wheel tire can be decreased. The second part (hereinafter also referred to as "slide") is mounted so as to be partially rotatable on the lever element in such a way that when the lever element is "pulled out", e.g. from the rest position, contact of all contact elements carried by the slide with the wheel tire is enabled. In one preferred embodiment, the distance between the axes of rotation of the contact elements carried by the (each) slide is approximately equal (±10%, preferably ±5%) to the distance between the axes of rotation of two adjacent contact elements of second (directly) adjacent lever elements when the contact elements are in contact with the inside of the wheel tire. By way of example, the distance between the axes of rotation of second contact elements carried by each of the slides of the preferably 8 or 12 lever elements is preferably approximately equal (±10%, preferably ±5%) to the distance between the axes of rotation of a contact element of a first slide and the axis of rotation of the nearest contact element of the (directly) adjacent slide. In other words, the angle β that the two axes of rotation of the contact elements of a slide span in relation to the axis of rotation of the wheel is preferably approximately 360°/2*n, wherein n is the number of lever elements or slides. The angle β that the two axes of rotation of the contact elements of a slide preferably span in relation to the axis of rotation of the wheel is therefore approximately (±10%, preferably ±5%) half the angle α between two lever elements. The angle α is the angle that the axes of rotation of two adjacent lever elements (or as shown in FIG. 14, with the same position of the lever elements, also the axes of rotation of the slides) span in relation to the axis of rotation of the wheel. The angle α thus corresponds to 360°/n, wherein n is the number of lever elements. In this embodiment, the force distribution is distributed evenly over the wheel tires (surface of the inside of the tire) as the contact elements contact the wheel tire at approximately the same distance. With 12 lever elements and two rollers per slide, 24 approximately equally (+10%, preferably ±5%) spaced contact elements are in contact with the inside of the tire (the angle β between respectively adjacent contact elements, both of two contact elements of one slide and the respectively adjacent contact elements of two adjacent slides, is then approximately 15° (±10%, preferably ±5%)). Contact elements that are spaced more or less equally over the inside of the tire also lead to a more even transfer of energy to the lever elements as this means that in typical flexing deformations, for example of car or truck tires, at least two lever elements are always displaced at the same time via their slides.

In one embodiment, the, preferably two, contact elements of a slide, preferably when they are designed as rollers, are surrounded or wrapped by a belt. The belt runs, for example, directly around both rollers, or additionally around a deflection roller, which can also be arranged on the slide. The surrounded contact elements, preferably rollers, come into contact with the inside of the tire via the belt. This increases the effective contact surface of the contact elements with the inside of the tire and thus reduces the point load and thus the load on the tire. The belt can, for example, be designed as a V-belt or multi V-belt to prevent it from running off the rollers.

In one preferred embodiment, the converter has at least two lever elements arranged rotationally symmetrical about the axis of rotation of the wheel, in particular at least 6 to 16, most preferably 8 to 12.

The lever element of the converter according to the invention comprises at least one contact element. The lever element makes contact with the inside of the tire via said contact element such that a deformation of the wheel tire due to contact with the road surface causes a (partial) rotational movement of the lever element. This means that the lever element has at least one contact element rotatably mounted in or on the lever element at the second end such that the contact element establishes contact between the lever element and the wheel tire.

The lever element preferably does not make direct contact with the inside of the wheel tire in any position of the rotation about its axis of rotation N at its first end (under normal operation), i.e. it does not touch it. Rather, only the contact element(s) come(s) into contact with the inside of the wheel tire, i.e. it touches it, if the lever element has rotated accordingly about the axis of rotation at the first end towards the tire surface (away from the rim). The axis of rotation of the contact element(s) is substantially parallel to the axis of rotation of the wheel. If there is more than one contact element present on a lever element, their axes of rotation are parallel. The possibility that the contact element is, on the one hand, mounted rotatably on the lever element and, on the other hand, can rotate about an axis that lies substantially parallel to the axis of rotation of the wheel makes it possible that the relative movement between the wheel tire and lever element is compensated and thus the friction between the wheel tire and lever element is minimized. The contact element is preferably substantially rotationally symmetrical with respect to its axis of rotation in terms of its dimensions, at least in the area that comes into contact with the inside of the wheel tire. In particular, it is thus a roller or partial roller (roller segment). The roller has a substantially cylindrical shape (the axis of rotation of the contact element corresponds to the cylinder axis), possibly with a circular outwardly curved cylindrical outer surface (barrel-shaped roller). Typical suitable radii of the contact element, i.e. preferably roller radii, are those where the ratio of the radius of the contact element to the radius of the inside of the wheel tire R (around the center of the wheel) is in the range of 0.04 to 0.08, preferably 0.05 to 0.07. Typical suitable roller radii, in particular for a car tire, are thus in the range of 18 mm to 30 mm. The contact element can preferably be rotated freely with respect to its fulcrum, in particular is freely rotatable by 360°. This means that the contact element can preferably rotate freely about the axis of rotation about which it is rotatably mounted and fixed to/in the lever element or slide, in particular completely about its own axis. This ensures uniform contact of the contact element with the inside of the wheel tire during operation even at higher speeds.

According to one preferred embodiment, the ratio of the distance A of the fulcrum of the lever element N from the wheel center M to the radius of the inside of the wheel tire R (A/R) is in the range of 0.55 to 0.60, preferably 0.56 to 0.59.

According to one preferred embodiment, the ratio of the distance B of the fulcrum of the lever element N from the contact point K of the contact element with the inside of the wheel tire, (in the case of a plurality of contact elements per lever element, the one with the greatest distance from the fulcrum N), to the radius of the inside of the wheel tire R (B/R) is in the range of 0.44 to 0.55, preferably 0.45 to 0.53, in particular 0.46 to 0.50.

In the converter according to the invention, the lever element, which at its first end is rotatably housed, can come into contact with the inside of the wheel tire via the at least one contact element. This means that the sum of the distance A of the fulcrum of the lever element N from the wheel center M and the distance B of the fulcrum N from the contact point K of the contact element with the inside of the wheel tire (in the case of a plurality of contact elements per lever element the contact point with the greatest distance from the fulcrum N) (A+B) is more than the radius of the inside of the wheel tire R. The ratio of A+B to the radius of the inside of the wheel tire R ((A+B)/R)) is according to the invention in the range of 102% to 110%, in particular 103% to 107%.

The radius R always refers here to the radius of the unloaded tire from the center of the wheel to the inside of the wheel tire (surface of the inside of the tire). The fulcrum of the lever element N refers to the fulcrum of the lever element at its first end.

The converter according to the invention further comprises a mechanical coupling element. This is configured and suitable for transferring the force occurring due to the rotational movement of the lever element, preferably to the generator(s). Typical suitable mechanical coupling elements are gears and axles, belts, chains and the like. The mechanical coupling element preferably comprises at least one ring with external or internal teeth, a chain or a belt, in particular a toothed belt and/or multi V-belt. The force of all lever elements of the converter is preferably transferred to a common mechanical coupling element, for example a ring with external or internal teeth, a chain or a belt, in particular toothed belt and/or multi V-belt. The latter mechanical coupling element is thus in frictional connection with all lever elements of the converter. This allows the generator(s) to be driven more continuously. The mechanical coupling element is preferably also in frictional connection with all generators. By distributing the total energy generated by the lever elements to several generators, they can be operated continuously, which allows efficient energy recovery with minimal material input.

In one preferred embodiment, the converter comprises a mechanical coupling element, which is designed as a belt, in particular a V-belt, toothed belt or multi V-belt, and which establishes the frictional connection of all lever elements, preferably 8 or in particular 12, of the converter with all generators, preferably three. It is preferred that the belt is guided respectively either around a roller that is connected to a lever element, and respectively alternately around a free-wheeling roller (deflection roller) or a roller connected to a generator (generator drive roller). Alternatively, which is particularly preferred, the belt is guided respectively over two rollers each connected to a (directly) adjacent lever element, followed by a free-wheeling roller or alternatively a roller connected to a generator. In the last embodiment, the belt thus most preferably runs over 12 rollers, each connected to a lever element, three free-wheeling rollers and three rollers connected to a generator.

Finally, the converter according to the invention comprises an electric generator, which is configured to convert the force obtained by the rotary movement of the lever element(s) and preferably transferred by the mechanical coupling element, into electrical energy. In one preferred embodiment, the converter has at least two generators arranged rotationally symmetrical about the axis of rotation of the wheel, in particular at least 2 to 12, most preferably 3 to 8, for example three or four. The number of lever elements is preferably a multiple of the number of generators.

The rotor of the generator is typically moved via the mechanical coupling element, the stator is connected to the support element/rim of the wheel. All generators are preferably driven simultaneously via the mechanical coupling element.

Alternatively, the rotor of the generator is moved via direct coupling with the lever elements, for example via the freewheel clutch or a connecting element attached or coupled to it, for example a connecting wheel; the stator is connected to the support element/rim of the wheel. In this embodiment, the force of the lever elements is transmitted through the mechanical coupling element to all freewheel clutches of the lever elements and via these to the generators, preferably all generators simultaneously, and these are thereby driven.

In order that the electrical generator, for example, can nevertheless be driven at suitable speeds even by relatively small displacements of a lever element and thus small movement of the mechanical coupling element, the converter has a gearbox or transmission according to a further preferred embodiment, preferably via the mechanical coupling element, preferably per generator, configured to produce a defined transmission between the (partial) rotary movement of the lever element and a rotary movement of the rotor of the generator. For example, the gearbox and/or transmission is configured to produce a transmission between the rotary movement of the lever element and the rotary movement of the rotor towards higher speeds of the rotor, in particular a transmission of a ratio of 1 to 2 to 1 to 10. In addition or alternatively, a corresponding transmission can be guaranteed by the frictional connection between the lever element and the mechanical coupling element and/or between the mechanical coupling element an the generator. A corresponding suitable speed of the generator is preferably only guaranteed by means of transmission between the lever element and the mechanical coupling element and/or between the mechanical coupling element and the generator.

In order to guarantee continuous movement and thus power transmission of the mechanical coupling element, it is preferred that the lever element(s) transfer the force to the mechanical coupling element via a freewheel clutch, i.e. a clutch dependent on the direction of rotation. The converter thus preferably has one freewheel clutch per lever element, configured for coupling depending on the direction of rotation, i.e. having a coupling direction for producing an acting coupling and a freewheeling direction. Typically, the freewheel clutch is configured such that the frictional connection occurs when the lever element moves towards the axis of rotation of the wheel, and correspondingly the freewheeling occurs when the lever element moves away from the axis of rotation of the wheel. The lever element, the freewheel clutch, the mechanical coupling element and the electrical generator are preferably arranged and configured in such a way that the rotary movement of the lever element is transferred to the rotor of the electric generator via the freewheel clutch in the coupling direction via the mechanical coupling element and is converted by the electric generator into electrical energy.

According to a further preferred embodiment, the converter according to the invention has a biasing means for the lever element(s), in particular a spring, which biases the rotation of the lever element about its first end with a force in the rotational movement of the lever elements caused by the deformation of the wheel tire due to contact with the road surface, i.e. in the direction of rotation of the lever element towards the axis of rotation of the wheel. The biasing element ensures that the lever element(s) are not in contact with the wheel tire when the wheel is at a standstill or when the wheel is only moving at a low speed, i.e. that the lever element(s) remain in a "retracted" state. The latter makes it easier to repair the wheel and change the tire on the wheel. The biasing means is then appropriately configured so that from suitable rotational speeds of the wheel, a movement of the lever element away from the axis of rotation of the wheel is allowed (the centrifugal force therefore exceeds the biasing force) and the contact element of the lever element can come into contact with the wheel tire. The biasing means is preferably configured such that from rotational speeds of the wheel of at least 100 rpm, more preferably at least 120 rpm, a movement of the lever element away from the axis of rotation of the wheel is allowed. Typical rotational speeds are around 125 rpm, which corresponds to a speed of around 15 km/h (in a car).

In order to prevent forces acting on the lever element from damaging the converter or its components due to excessive shocks and/or excessive deformation of the wheel tread, a corresponding protective mechanism is preferably provided, in particular an overload protection device. Preferably, the freewheel clutches, the clutches within or to the mechanical coupling element and/or the clutches to the generators are safety clutches with overload protection, which allow rotation without effective coupling if defined maximum forces are exceeded.

The present invention further relates to a system for obtaining electrical energy in a rolling wheel of a vehicle from the deformation of the wheel tire due to contact with the road surface, comprising a converter as described above as well as a support element/wheel rim as a supporting structure. In one preferred embodiment, the lever elements including contact elements do not project over the rim flanges, i.e. over the outer surface of a cylinder defined by the rim flanges.

In one embodiment, the system has a converter as described above as well as a supporting structure, wherein the supporting structure is typically configured so as to hold the energy converter in a fixed arrangement around the center axis of the wheel.

In particular, the supporting structure can be designed itself as the rim of the wheel or be integrated therein, or the system has a rim (specially provided to be combined with the supporting structure) configured to receive the supporting structure in a fixed manner. The rim is preferably designed in one part.

According to a further embodiment, the system has a multi-part rim, which can simplify the installation of the converter or the supporting structure in the wheel. For example, the multi-part rim is designed as a two-part rim with a rim well and a rim sleeve or as a three-part rim with a rim well, a rim sleeve and a rim star. In this case, the converter or the supporting structure and the multi-part rim can be configured, for example, such that the converter or the supporting structure is mounted on a rim well of the multi-part rim.

Finally, the present invention relates to a land vehicle, preferably a motor vehicle or a lorry, or a wheel, comprising a system as described above.

BRIEF DESCRIPTION OF THE FIGURES

The invention will now be described based on the drawings.

DETAILED DESCRIPTION

Figure 1:
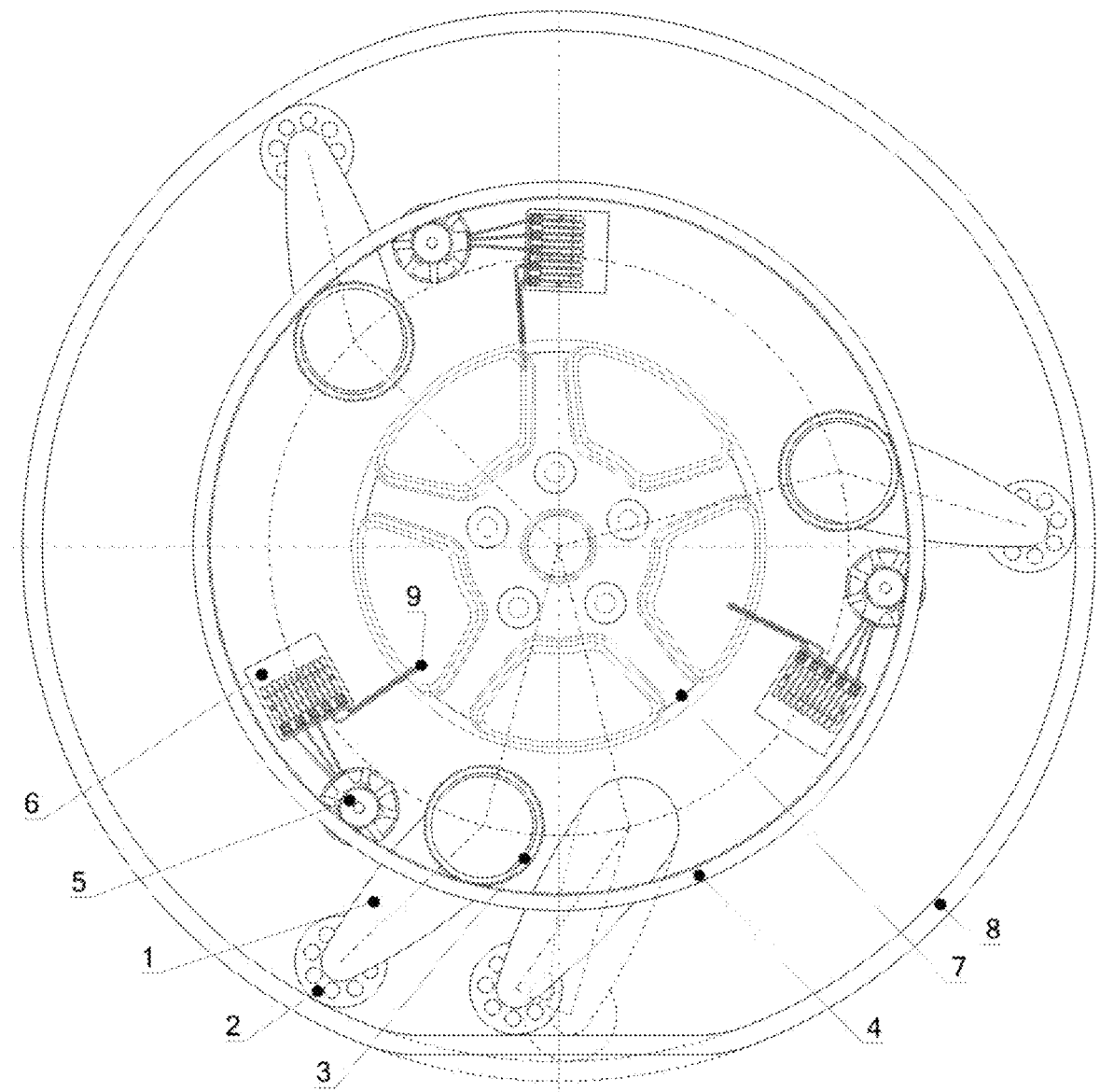
FIG. 1 shows a schematic side view of a converter according to the invention.

A converter according to the invention is shown in FIG. 1, which comprises lever elements 1 including contact elements 2, in this case rollers. The deformation of the tire 8 due to contact with the road surface causes the lever element, which lies against the inside of the tire 8 in the area of the contact with the road surface via the contact element, to partially rotate about the axis of rotation on its first end, as shown at the bottom of FIG. 1. The force that occurs is transferred to the generator 5 via the freewheel clutch 3 and the mechanical coupling element 4, designed here as a free-floating central ring with internal teeth. The electrical energy produced is fed into the vehicle via the controller 6 via the connection for power output 9. Typical connections according to the invention are lines, sliding contacts (brushes) or electromagnetic transmission. The lever elements 1 are arranged rotationally symmetrical about the rim 7.

Figure 2:
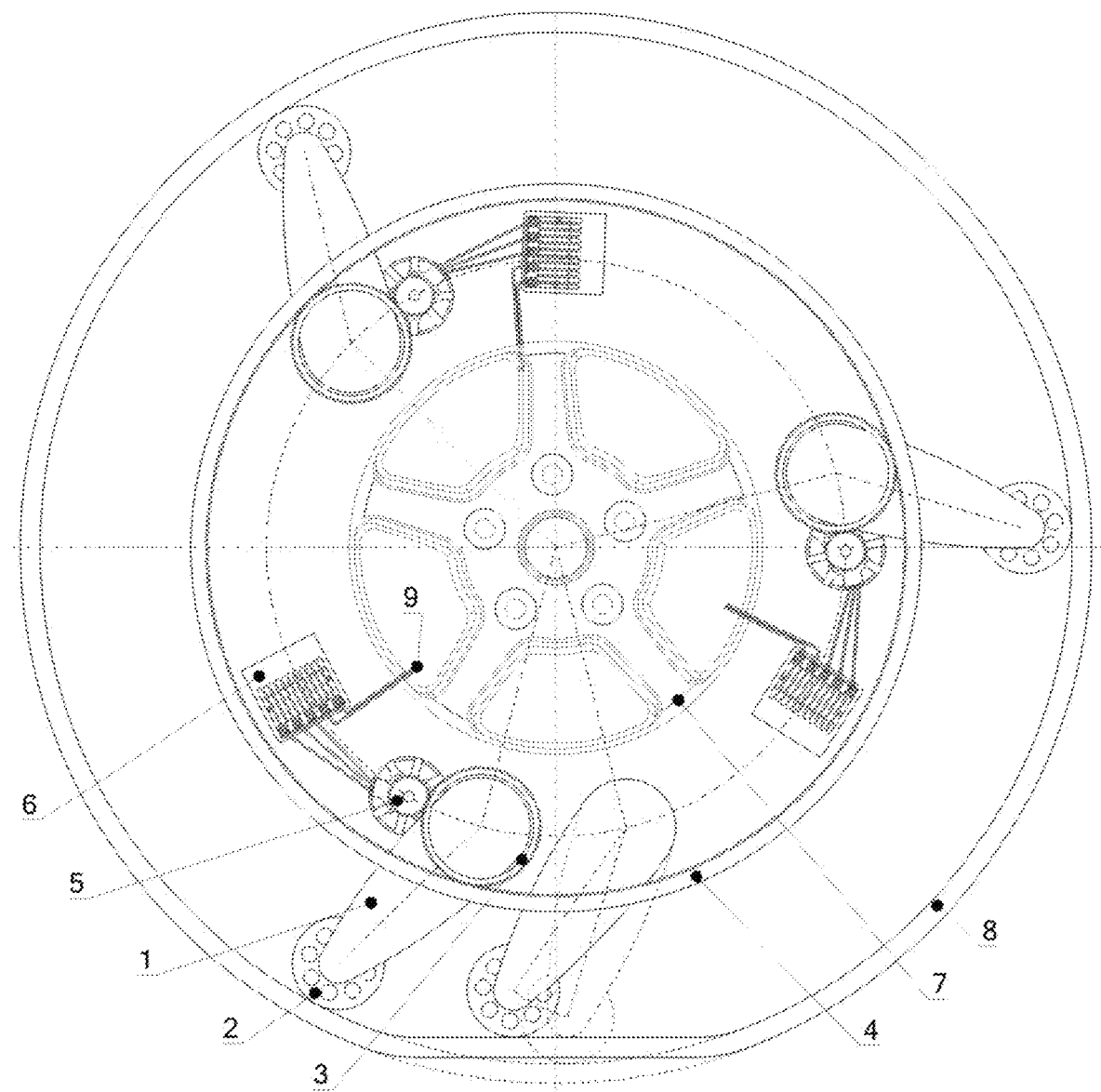
FIG. 2 shows a schematic side view of a converter according to the invention.

An alternative converter according to the invention is shown in FIG. 2, which comprises lever elements 1 including contact elements 2, in this case rollers. The deformation of the tire 8 due to contact with the road surface causes the lever element, which lies against the inside of the tire 8 in the area of the contact with the road surface via the contact element, to partially rotate about the axis of rotation on its first end, as shown at the bottom of FIG. 2. The force that occurs is transferred directly, on the hand, to a generator 5 via the freewheel clutch 3, as well as to the other freewheel clutches and the generators via the mechanical coupling element 4. The electrical energy produced is fed into the vehicle via the controller 6 via the connection for power output 9. The lever elements 1 are arranged rotationally symmetrical about the rim 7.

Figure 3:
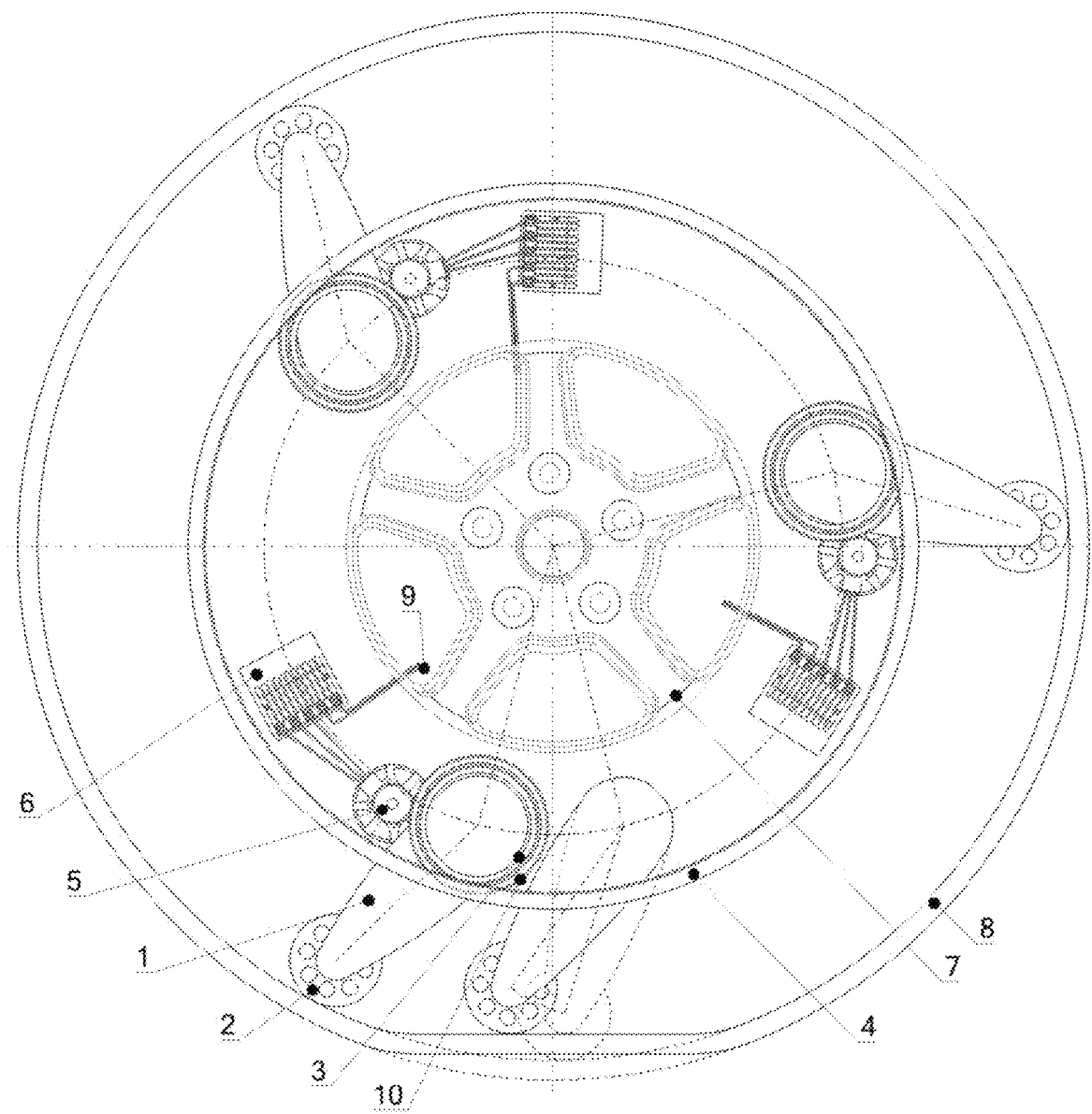
FIG. 3 shows a schematic side view of a converter according to the invention.

An alternative converter according to the invention is shown in FIG. 3, which comprises lever elements 1 including contact elements 2, in this case rollers. The deformation of the tire 8 due to contact with the road surface causes the lever element, which lies against the inside of the tire 8 in the area of the contact with the road surface via the contact element, to partially rotate about the axis of rotation on its first end, as shown at the bottom of FIG. 3. The force that occurs is transferred, on the hand, to a generator 5 via the freewheel clutch 3 and a connecting wheel with external teeth 10, as well as to the other freewheel clutches and the generators via the mechanical coupling element 4. The electrical energy produced is fed into the vehicle via the controller 6 via the connection for power output 9. The lever elements 1 are arranged rotationally symmetrical about the rim 7.

Figure 4:
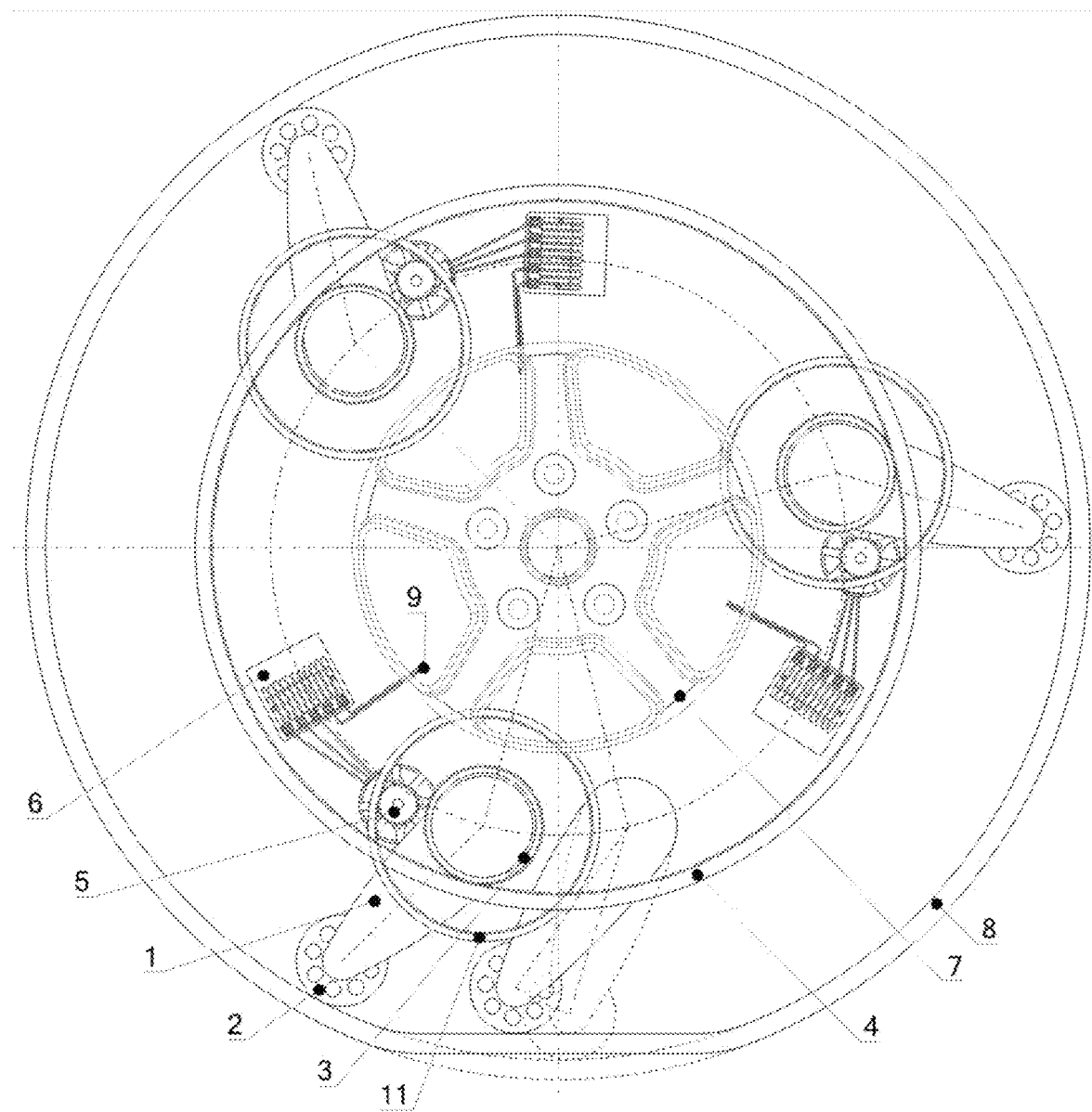
FIG. 4 shows a schematic side view of a converter according to the invention.

An alternative converter according to the invention is shown in FIG. 4, which comprises lever elements 1 including contact elements 2, in this case rollers. The deformation of the tire 8 due to contact with the road surface causes the lever element, which lies against the inside of the tire 8 in the area of the contact with the road surface via the contact element, to partially rotate about the axis of rotation on its first end, as shown at the bottom of FIG. 4. The force that occurs is transferred, on the hand, to a generator 5 via the freewheel clutch 3 and a connecting wheel with internal teeth 11, as well as to the other freewheel clutches and the generators via the mechanical coupling element 4. The electrical energy produced is fed into the vehicle via the controller 6 via the connection for power output 9. The lever elements 1 are arranged rotationally symmetrical about the rim 7.

Figure 5:
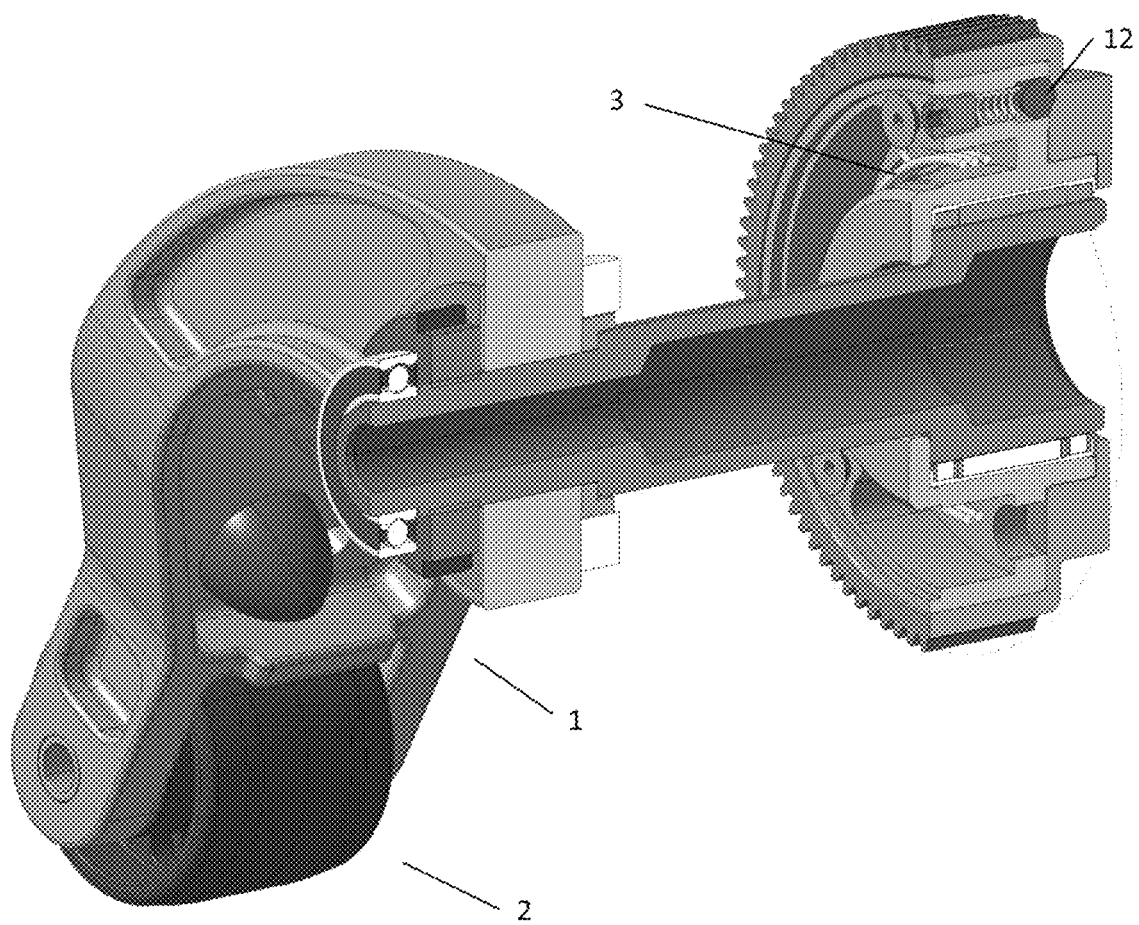
FIG. 5 shows an isometric view of a lever element including contact element.

FIG. 5 shows a detail view of an embodiment of a lever element 1 with a contact element 2, in this case designed as a roller. The force is transmitted to the gear via the axle on the first end of the lever element. It transmits the force to the mechanical coupling element and possibly directly to a generator (not shown). The freewheel clutch 3 transfers the movement of the lever element only in one direction; the overload protection device 12 ensures that excessive forces are not transmitted.

Figure 6:
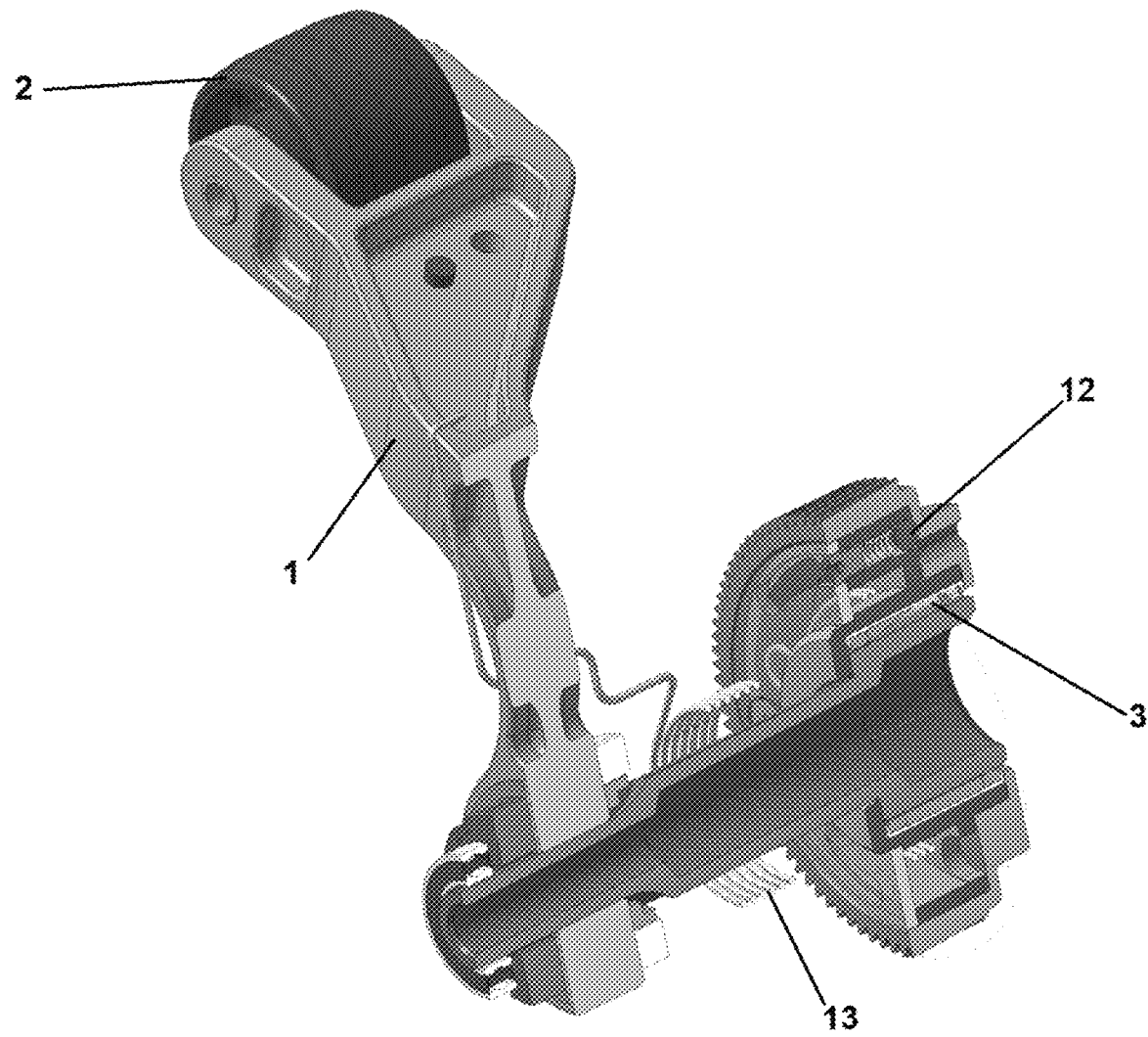
FIG. 6 shows an isometric view of a lever element including contact element.

FIG. 6 shows a detail view of an embodiment of a lever element 1 with a contact element 2, in this case designed as a roller. The force is transmitted to the gear via the axle on the first end of the lever element. It transmits the force to the mechanical coupling element and possibly directly to a generator (not shown). The freewheel clutch 3 transfers the movement of the lever element only in one direction; the overload protection device 12 ensures that excessive forces are not transmitted. A spring is used as the biasing element 13.

Figure 7:
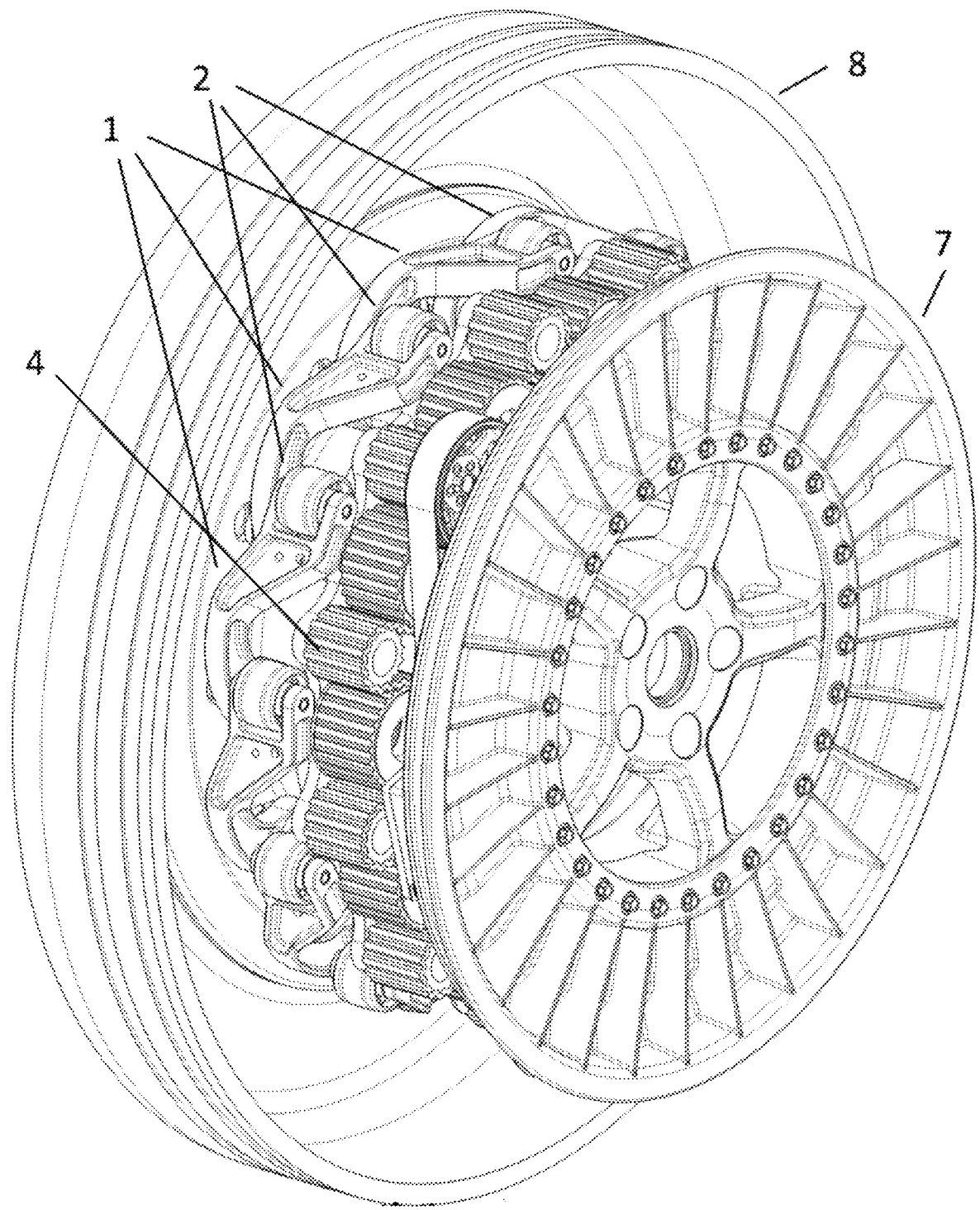
FIG. 7 shows an isometric view of a converter according to the invention with lever elements with a contact element with a rim with a tire.

FIG. 7 shows a converter according to the invention integrated into a wheel with a tire 8. The converter comprises a set of lever elements 1 each with a contact element 2 in a retracted state, i.e. in close contact with the base of the rim 7. The mechanical coupling element 4 is designed as a toothed belt and connects all drive shafts of the lever elements 1 as well as the drive shafts for the generators (not shown).

Figure 8:
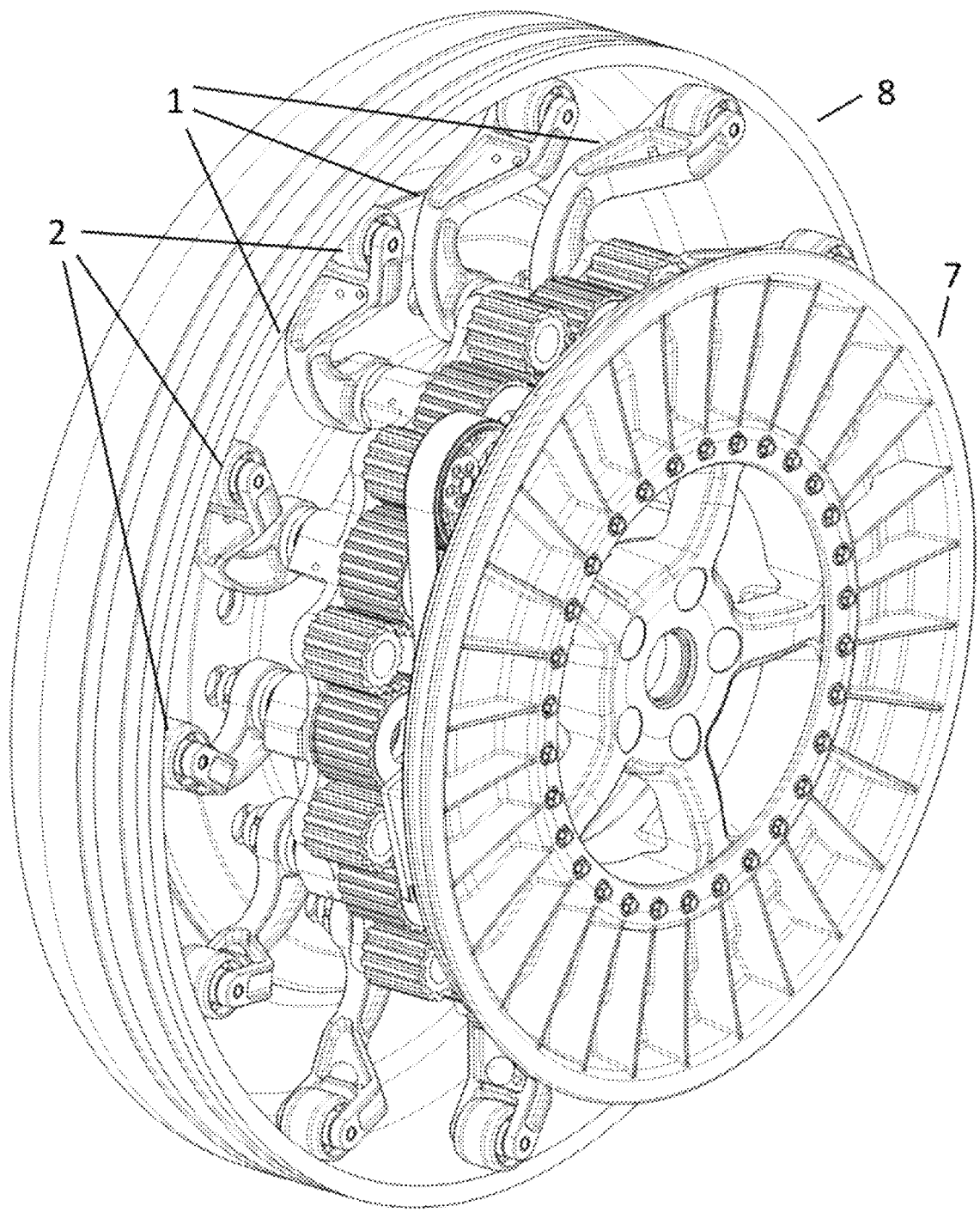
FIG. 8 shows an isometric view of a converter according to the invention with lever elements with a contact element with a rim with a tire.

FIG. 8 shows a converter according to the invention integrated into a wheel with a tire 8. The converter comprises a set of lever elements 1 each with a contact element 2 as in FIG. 7, but in an extended state, for example due to the influence of centrifugal force at a sufficiently high rotational speed of the wheel, i.e. folded away from the rim 7. In this state, the contact elements 2 are in contact with the inside of the tire 8. A flexing movement of the tire due to contact with the road service leads to a corresponding rotary movement of the lever elements. The mechanical coupling element 4 is designed as a toothed belt and connects all drive shafts of the lever elements 1 as well as the drive shafts for the generators (not shown).

Figure 9:
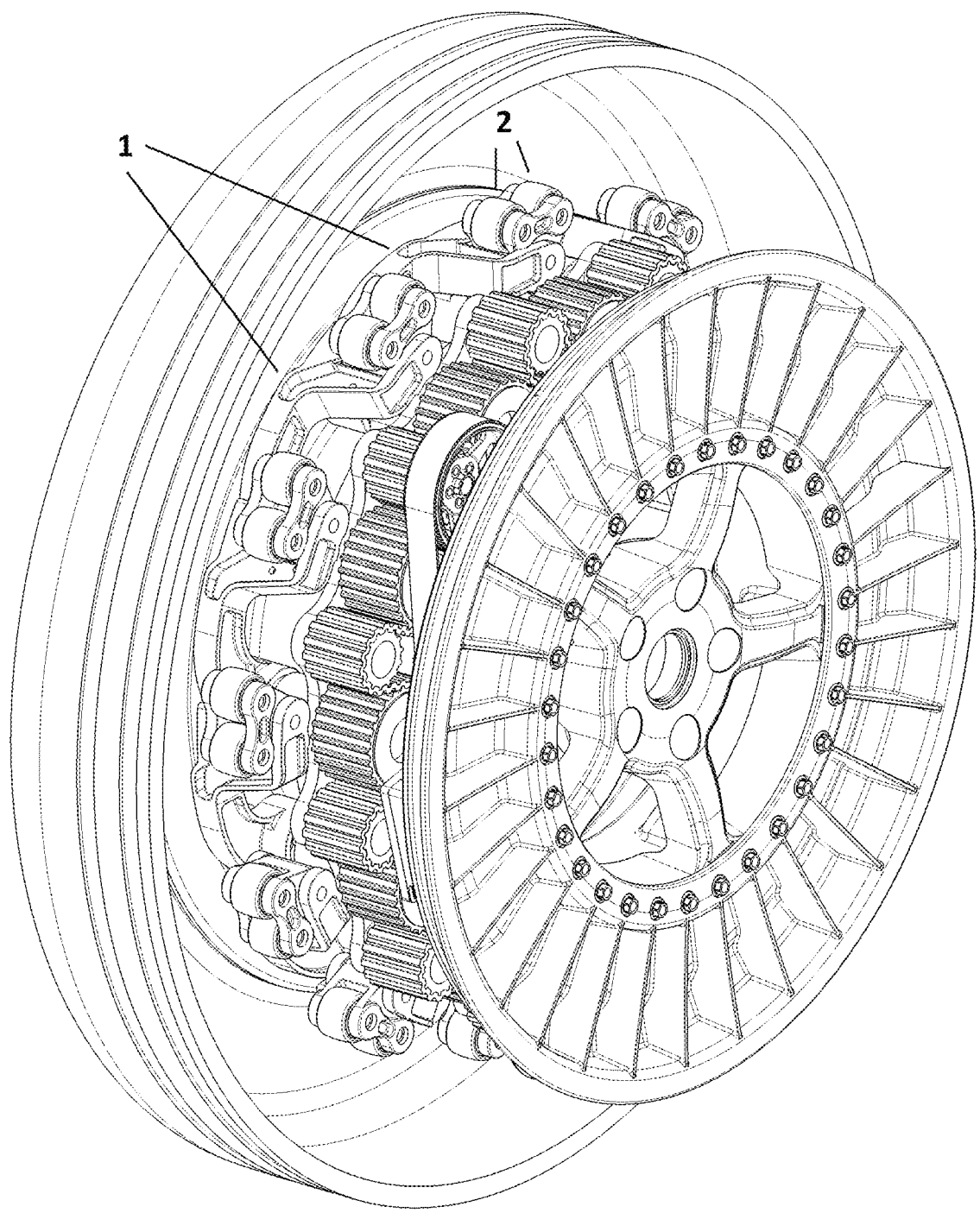
FIG. 9 shows an isometric view of a converter according to the invention with lever elements with two contact elements each.

FIG. 9 shows a converter according to the invention integrated into a wheel. The converter comprises a set of lever elements 1 each with two contact elements 2 in a retracted state according to FIG. 7, i.e. in close contact with the base of the rim.

Figure 10:
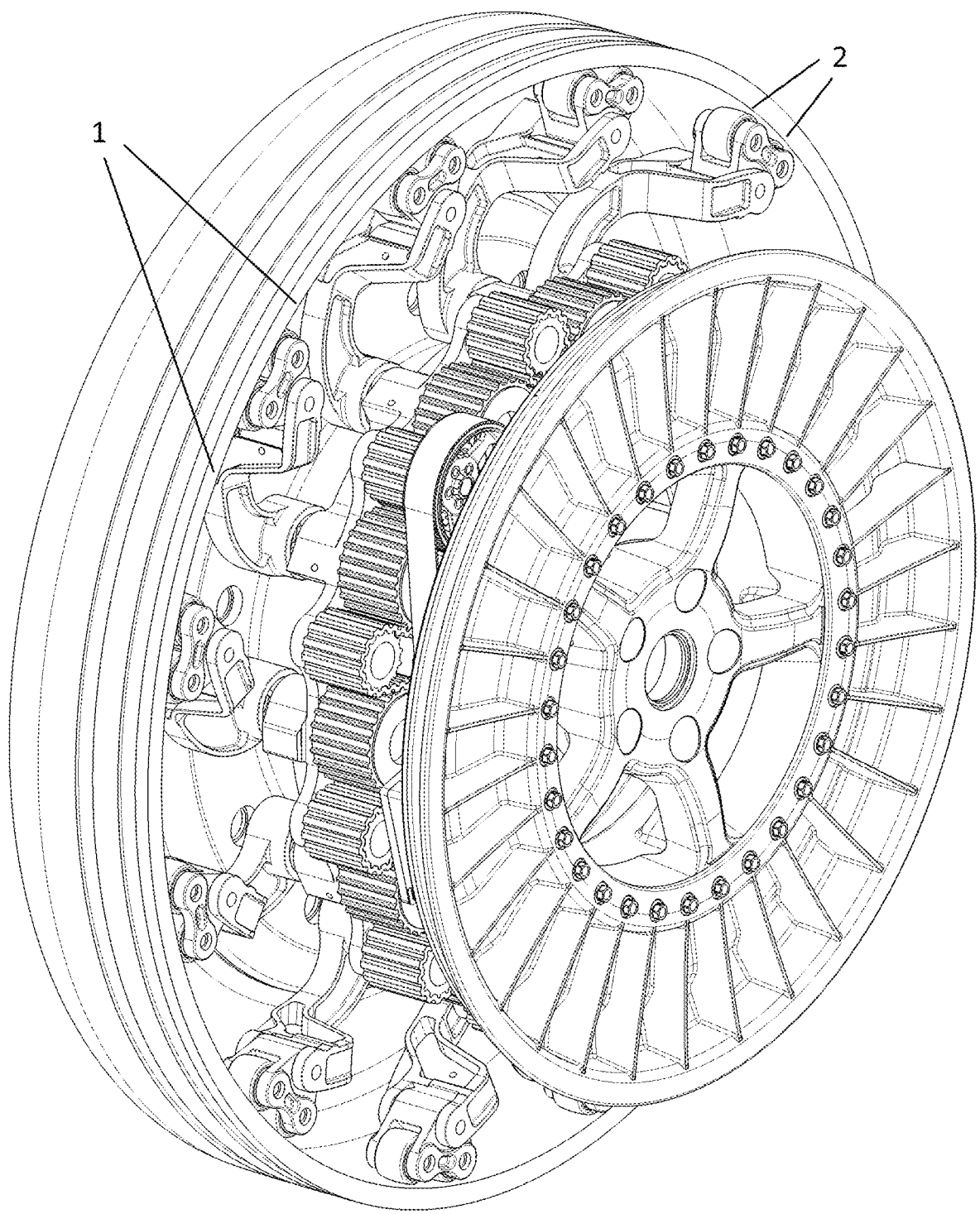
FIG. 10 shows an isometric view of a converter according to the invention with lever elements with two contact elements each.

FIG. 10 shows a converter according to the invention integrated into a wheel. The converter comprises a set of lever elements 1 each with two contact elements 2 as in FIG. 9, but in an extended state (according to FIG. 8), for example due to the influence of centrifugal force at a sufficiently high rotational speed of the wheel, i.e. folded away from the rim. In this state, the contact elements 2 are in contact with the inside of the tire. A flexing movement of the tire due to contact with the road service leads to a corresponding rotary movement of the lever elements.

Figure 11:
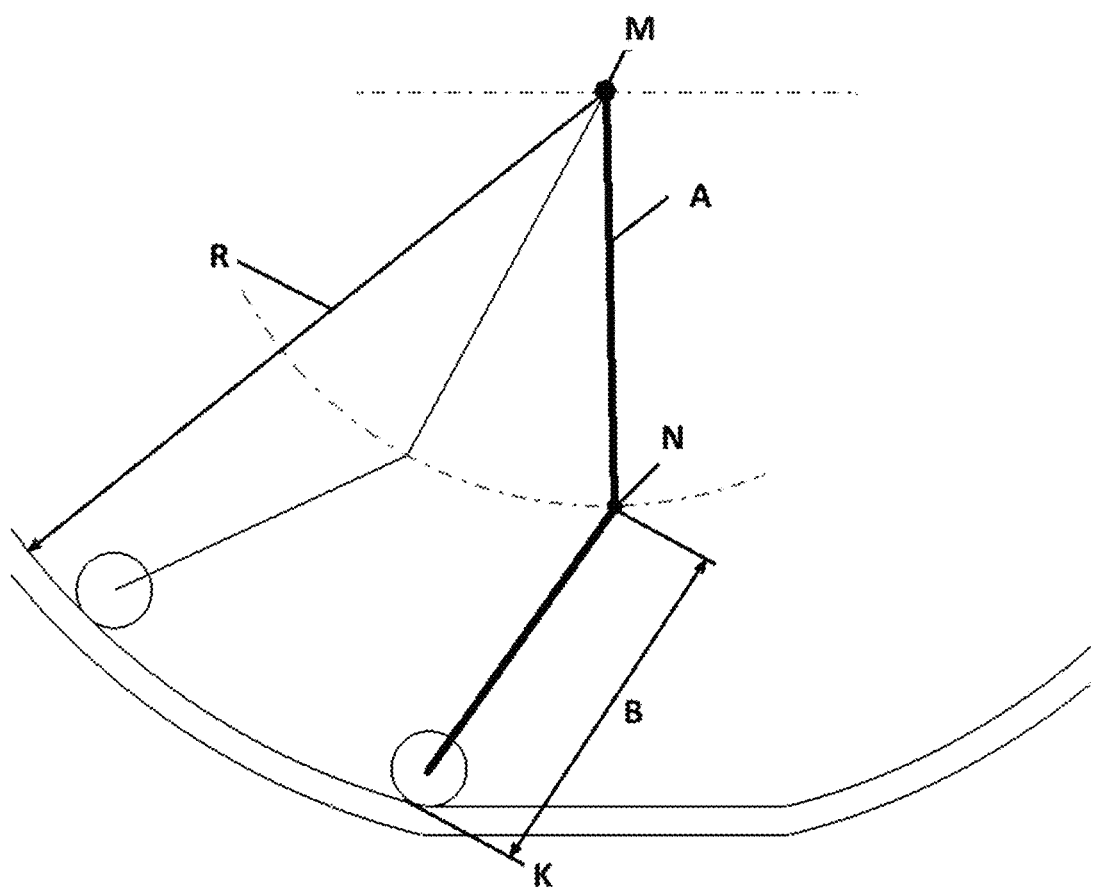
FIG. 11 illustrates the ratios of the distances of the axis of rotation of the lever element N from the wheel center M and the contact point K.

FIG. 11 illustrates the length A as a distance of the fulcrum of the lever element N from the wheel center M and the length B as the distance of the fulcrum of the lever element N from the contact point K. The latter is the greatest distance of the contact element from the fulcrum of the lever element N that comes or can come into contact with the inside of the wheel tire.

Figure 12:
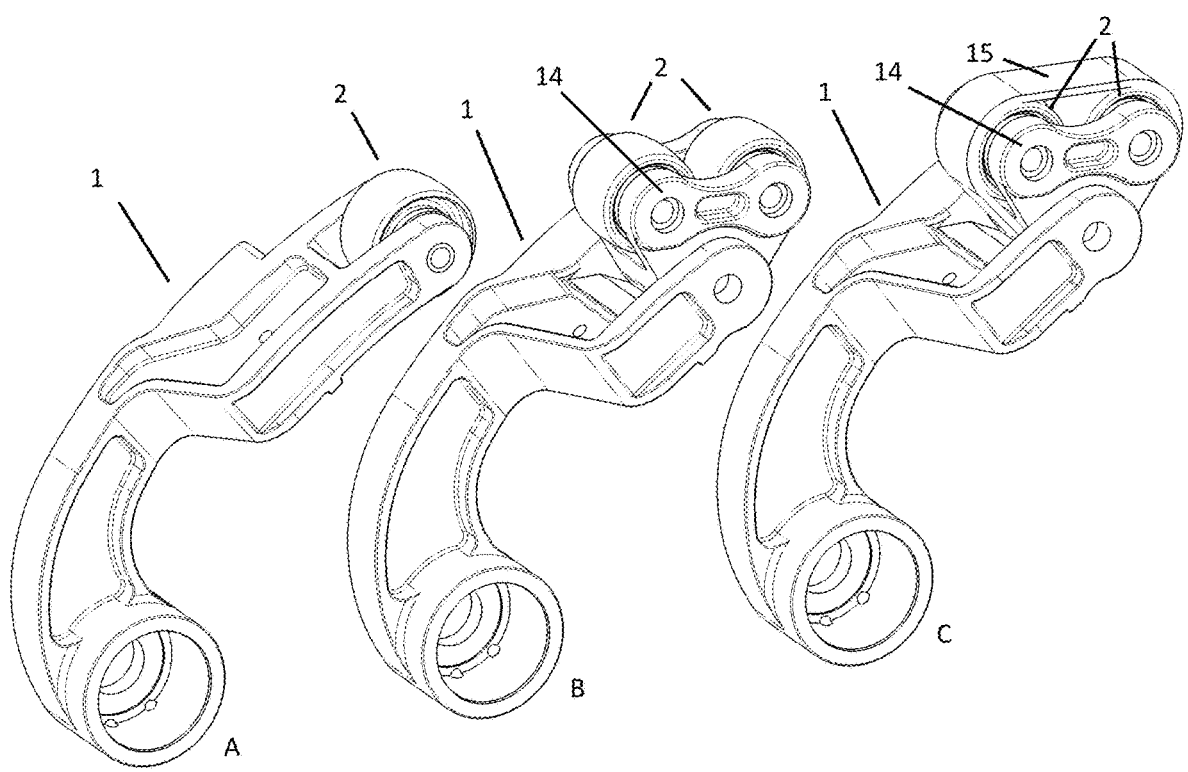
FIG. 12 illustrates three embodiments of the lever element.

FIG. 12 shows detail views of three embodiments of lever elements 1 with contact element(s) 2, designed here as a roller. In the embodiment A, the lever element 1 supports a roller as contact element 2. In the embodiment B, the lever element 1 supports a slide 14 (second part), which supports two rollers as contact elements 2. In the embodiment C, the lever element 1 also supports a slide 14 (second part), which supports two rollers as contact elements 2. In the embodiment C, the two rollers as contact elements 2 are surrounded by a belt 15, which is also guided over another roller (not shown) mounted on the slide.

Figure 13:
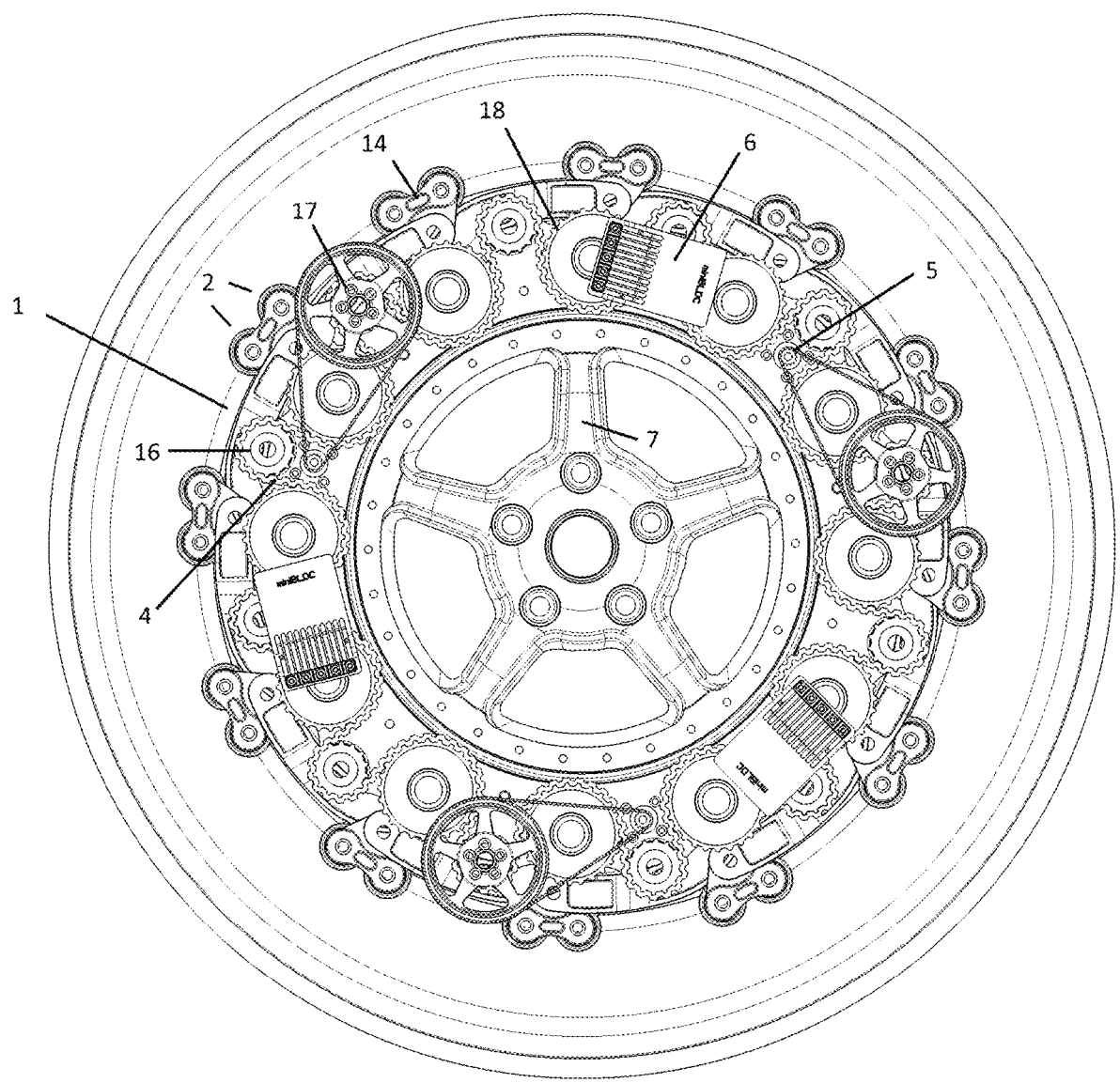
FIG. 13 shows a schematic side view of a converter according to the invention with lever elements with two contact elements each.

FIG. 13 shows a converter according to the invention integrated into a wheel with a tire. The converter comprises a set of lever elements 1 each with two contact elements 2, which are mounted in a slide 14. The lever elements are shown in a retracted state, i.e. in close contact with the base of the rim 7. The mechanical coupling element 4 is designed as a toothed belt and connects all drive shafts of the lever elements 1 as well as the drive shafts for the generators 5. The toothed belt runs alternately over lever element drive rollers 18 as well as either deflection rollers 16 or generator drive rollers 17. The generators 5 are driven via the generator drive rollers 17, again via belts.

Figure 14:
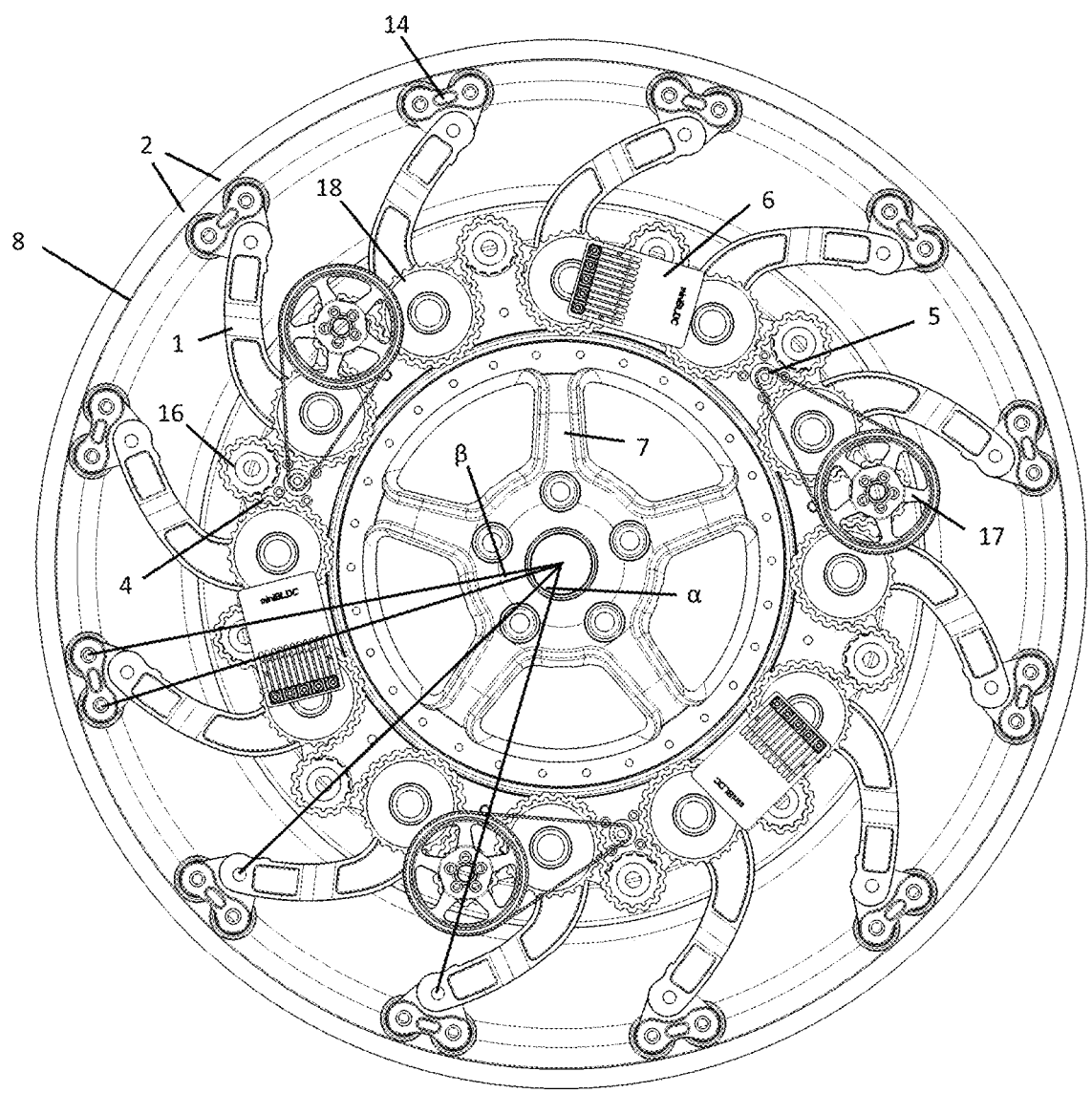
FIG. 14 shows a schematic side view of a converter according to the invention with lever elements with two contact elements each.

FIG. 14 shows a converter according to the invention integrated into a wheel with a tire 8. The converter comprises a set of lever elements 1 each with two contact elements 2, which are mounted in a slide 14. The angle α is the angle that the axes of rotation of two adjacent lever elements (or as shown in the figure, with the same position of the lever elements, also the axes of rotation of the slides) span in relation to the axis of rotation of the wheel. The angle α thus corresponds to 360°/n, wherein n is the number of lever elements. The angle β is the angle that the two axes of rotation of the contact elements of a slide span in relation to the axis of rotation of the wheel. The lever elements are, however, as shown in FIG. 7, in an extended state, for example due to the influence of centrifugal force at a sufficiently high rotational speed of the wheel, i.e. folded away from the rim 7. In this state, the contact elements 2 are in contact with the inside of the tire 8. A flexing movement of the tire due to contact with the road service leads to a corresponding rotary movement of the lever elements. The mechanical coupling element 4 is designed as a toothed belt and connects all drive shafts of the lever elements 1 as well as the drive shafts for the generators 5. The toothed belt runs alternately over lever element drive rollers 18 as well as either deflection rollers 16 or generator drive rollers 17. The generators 5 are driven via the generator drive rollers 17, again via belts.

LIST OF REFERENCE NUMERALS

1 Lever element
2 Contact element
3 Freewheel clutch
4 Mechanical coupling element
5 Generator
6 Controller
7 Rim
8 Tire
9 Connection for power output
10 Connecting gear with external teeth
11 Connecting gear with internal teeth
12 Overload protection device
13 Biasing element
14 Slide
15 Belt on contact elements
16 Deflection roller
17 Generator drive roller
18 Lever element drive roller

The invention claimed is:

1. A converter for obtaining electrical energy in a rolling wheel of a vehicle from the deformation of the wheel tire due to contact with the road surface, comprising
   a) at least one lever element, which at its first end is rotatably housed, and at its second end is configured to come into contact with the inside of a wheel tire via at least one contact element such that a deformation of the wheel tire due to contact with the road surface causes a rotational movement of the lever element,
   b) a mechanical coupling element which is suitable for transferring the force occurring due to the rotational movement of the lever element, and
   c) at least one electric generator which is configured to convert the transferred force into electrical energy,
   wherein, at the second end of the lever element, the contact element is rotatably housed at the lever element about an axis of rotation such that the contact element establishes contact between the lever element and the wheel tire, and the axis of rotation of the contact element runs substantially parallel to the axis of rotation of the wheel, characterized in that the sum (A+B) of the distance A of the fulcrum N of the lever element from the wheel centre M and the distance B of the fulcrum N from the contact point K of the contact element with the inside of the wheel tire, in the case of a plurality of contact elements per lever element the contact point with the greatest distance from the fulcrum N, relative to the radius of the inside of the wheel tire R ((A+B)/R)) is in the range from 102% to 110%.

2. The converter according to claim 1, characterized in that the electric generator is configured to convert the force transferred by the mechanical coupling element into electrical energy.

3. The converter according to claim 1, characterized in that the contact element has a substantially rotationally symmetrical shape in respect of rotation about its fulcrum, and in particular represents a roller.

4. The converter according to claim 1, characterized in that the contact element can be rotated freely about its fulcrum, in respect of rotation.

5. The converter according to claim 1, characterized in that the contact element can be rotated freely by 360° about its fulcrum, in respect of rotation.

6. The converter according to claim 1, characterized in that the fulcrum N of the lever element runs substantially parallel to the axis of rotation of the wheel.

7. The converter according to claim 1, characterized in that the converter has at least two lever elements arranged rotationally symmetrical about the axis of rotation of the wheel.

8. The converter according to claim 1, characterized in that the converter has at least two electric generators arranged rotationally symmetrical about the axis of rotation of the wheel.

9. The converter according to claim 1, characterized in that the lever element(s) transfer the force to the mechanical coupling element via a freewheel clutch.

10. The converter according to claim 7, characterized in that all lever elements transfer the force to a common mechanical coupling element.

11. The converter according to claim 1, characterized in that the mechanical coupling element is configured such that it can transfer the force experienced by the lever elements to all electric generators.

12. The converter according to claim 1, characterized in that the mechanical coupling element comprises a ring with external or internal teeth, a chain or a belt, in particular a toothed belt.

13. The converter according to claim 1, characterized in that the converter also has a biasing means for the lever elements, which biases the rotation of the lever elements about their first end with a force in the rotational movement of the lever elements caused by the deformation of the wheel tire due to contact with the road surface.

14. A system for obtaining electrical energy in a rolling wheel of a vehicle from the deformation of the wheel tire due to contact with the road surface, comprising a converter according to claim 1, as well as a wheel rim as supporting structure.

15. A vehicle or a wheel comprising a system according to claim 14.

* * * * *